Nov. 15, 1966  W. R. WOOD  3,284,875
ROLL CONSTRUCTION
Filed March 30, 1965  2 Sheets—Sheet 1
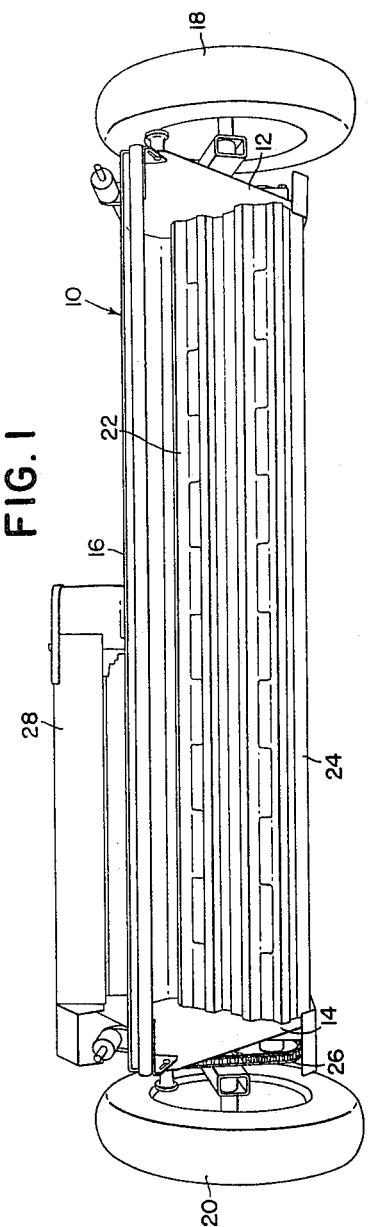
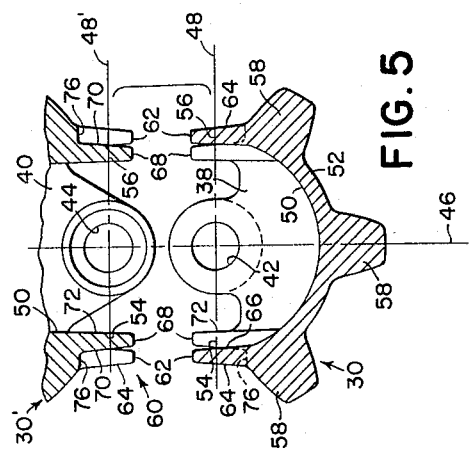
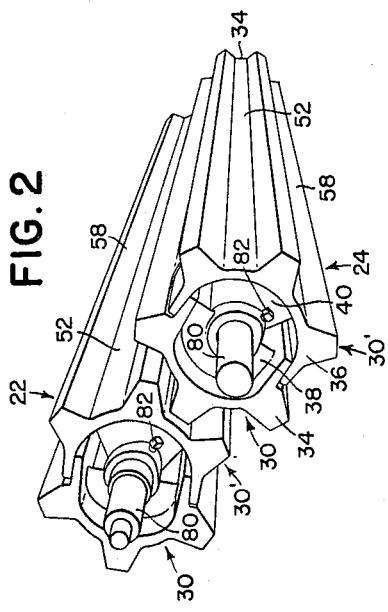
INVENTOR.
WILLIAM R. WOOD
BY
John M. Nolan
ATTORNEY

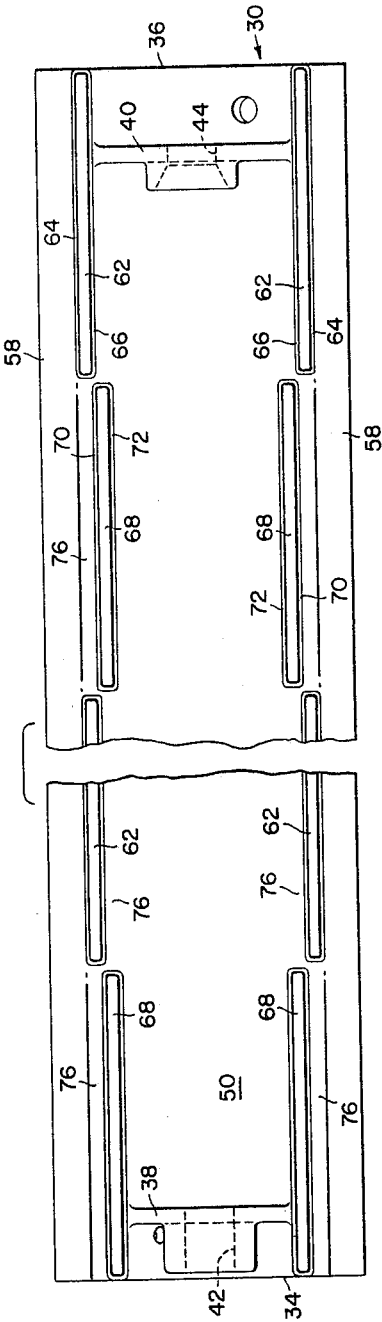
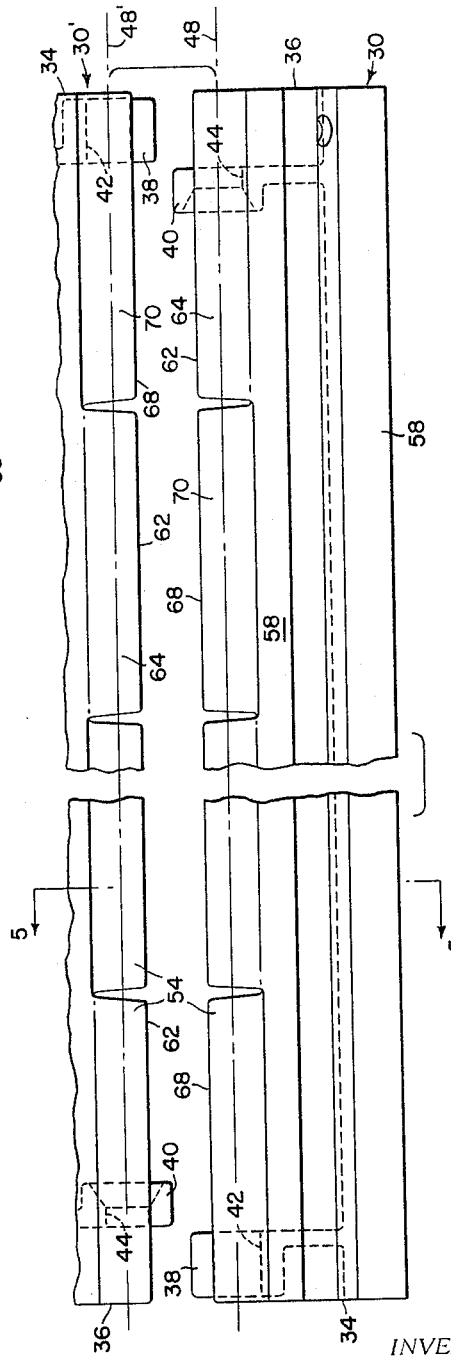

United States Patent Office 3,284,875  
Patented Nov. 15, 1966

3,284,875  
ROLL CONSTRUCTION  
William R. Wood, Ottumwa, Iowa, assignor to Deere & Company, Moline, Ill., a corporation of Delaware  
Filed Mar. 30, 1965, Ser. No. 443,989  
11 Claims. (Cl. 29—121)

This invention relates to an improved roll construction adapted for use in agricultural machines, a good example of which is the well-known crop conditioner; although, the roll will find utility in allied environments.

A conventional crop conditioner includes a pair of transverse associated rolls between which a previously harvested crop, such as hay, is passed to crack or crush the crop stems, thereby accelerating the curing of the crop. The rolls may be smooth, fluted, or a combination of the two.

The present invention provides an improved construction for a fluted type roll, which preferably meshes with a similar fluted roll to crimp the hay or like material as it passes between the rolls.

Such rolls have previously been made by welding or otherwise fastening a plurality of longitudinally extending teeth or ribs to the outer periphery of a cylinder or by coaxially assembling a plurality of short fluted castings on a common shaft. These types of roll fabrication are necessarily time-consuming and thus relatively expensive.

According to the present invention, the fluted roll is made by assembling identical elongated roll halves of C-shaped section, which are preferably formed by casting, and which include the longitudinal ribs. This substantially eliminates the welding or machining which has previously been necessary to produce such crushing rolls.

Thus, the primary object of the present invention is to provide an improved roll for an agricultural machine and more specifically to provide such a roll by joining roll halves.

Another object is to make such rolls of cast construction to reduce the expense of fabricating and assembling the rolls and further to provide such a roll comprising identical roll halves so that the same mold configuration can be used for both roll halves and also so that a hollow roll can easily be cast to reduce the weight and cost of the roll.

Another object is to provide such a roll which can be easily disassembled to replace a damaged roll half and which also is of rugged construction and not easily damaged.

Still another object is to provide a simple and inexpensive method of fabricating and assembling such a roll.

These and other object will become apparent from a consideration of the following detailed description and accompanying drawings wherein:

FIG. 1 is a rear perspective view of a crop conditioner having a pair of the improved rolls.

FIG. 2 is a perspective view of an associated pair of improved rolls.

FIG. 3 is a plan view of a roll half with an intermediate portion of the roll half omitted.

FIG. 4 is an exploded elevation view of a pair of roll halves positioned for assembly with an intermediate portion of each half omitted and the upper portion of the top roll also omitted.

FIG. 5 is a transverse section taken along the line 5—5 of FIG. 4.

As best seen in FIG. 1, the machine chosen for purposes of illustration is a crop conditioner including a main frame 10 having opposite lateral sides 12 and 14 and an upper housing portion 16 extending between said sides. The frame 10 is carried by right and left wheels 18 and 20 for advance over a field of previously harvested crops, such as hay or the like, which are lying on the stubble in swaths or windrows following the cutting operation.

A pair of horizontal cooperating rolls 22 and 24 are journaled at opposite ends on the sides 12 and 14 and are rotated in opposite directions by a drive means 26 operably connected to the power take-off of the draft vehicle (not shown) via a shielded power train 28. The roll 22 is spaced upwardly and forwardly from the roll 24 relative to the direction of machine travel. The lower roll 24 raises the crop from the stubble and moves it between the rolls, whereby the crop is crushed or crimped and returned to the field rearwardly of the rolls for subsequent pickup by a baler or the like.

When the rolls 22 and 24 are both of the fluted type, as shown in the drawings, they are mounted in a meshing relationship, as best seen in FIG. 2. In certain types of crop conditioners, only one roll is of the fluted type. The present invention concerns the construction of the fluted roll, whether used with another similar or different roll.

Each fluted roll includes a pair of identical, elongated, hollow, semi-cylindrical roll halves 30 and 30'. Each roll half has first and second opposite ends 34 and 36 and includes first and second radial end members 38 and 40, which are proximate to the ends 34 and 36 respectively and which have axial bores 42 and 44 respectively. The second radial member 40 is spaced from the second end 36 the same distance that the first radial member 38 is spaced from the first end 34 plus the axial dimension of the first radial member 38.

Each semi-cylindrical roll half is substantially symmetrical about a longitudinal median plane 46, as best seen in FIG. 3. Diametral base planes 48 and 48' of the semi-cylindrical roll halves 30 and 30' respectively extend transversely to the plane of symmetry 46. The roll halves are hollow and each has an inner surface 50, an outer periphery 52, and longitudinal terminal edges 54 and 56 between the inner surface 50 and the outer periphery 52, the terminal edges lying substantially along the planes 48 and 48'.

A plurality of longitudinal, parallel ribs or teeth 58 extend between the opposite ends 34 and 36 along the outer periphery 52 of each roll half 30 and 30'. The ribs 58 are equally spaced angularly, and the first rib from each lateral edges 54 and 56 is angularly spaced from the diametral base plane 48 and 48' by one-half the angular distance between the adjacent ribs.

A plurality of longitudinally extending tabs 60 project approximately in a tangential direction from the terminal edges 54 and 56. The tabs 60 along each terminal edge are substantially the same length and are evenly divided between outer tabs 62 having outer and inner faces 64 and 66, and inner tabs 68, which also have outer and inner faces 70 and 72 respectively. The inner tabs 68 and the outer tabs 62 are mounted along each terminal edge in an alternating relationship and, as best seen in FIG. 5, each tab is slightly tapered, the inner surfaces 66 of the outer tabs being longitudinally alined with the outer surfaces 70 of the inner tabs 68 along the base planes 48 and 48'. Thus the inner and outer tabs respectively form adjacent rows or banks along each terminal edge. A recess 76 adaptable to receive a tab 60 is alined with and extends between each tab in each row, each recess being adjacent a tab in the adjacent row. The inner tabs 68 along each terminal edge are diametrally opposite the inner tabs 68 along the opposite terminal edge.

While the preferred arrangement of the tabs 60 and recesses 76 is shown and described, it is to be understood that other arrangements, sizes, and shapes of the tabs and recesses are possible and fall within the scope of the invention. Moreover, since the alternating tabs 60 and recesses 76 extend the entire length and width of the terminal edges 54 and 56, the terminal edges are shown as imaginary lines along the planes 48 and 48'. However, the tabs 60 and recesses 76 could be longitudinally spaced to allow clearly defined terminal edges within the scope of the invention.

To assemble the roll halves 30 and 30' to form a fluted roll, one roll half is reversed end for end relative to the other half so that the second end 36 of the roll half 30' is alined with the first end 34 of the roll half 30, while the first end 34 of the roll half 30' is alined with the second end 36 of the roll half 30. The roll halves are positioned with their terminal edges 54 and 56 respectively opposite the terminal edges 54 and 56 on the other roll half, as shown in FIGS. 4 and 5, and then compressed to a coaxial position wherein the bores 42 and 40 on both roll halves are axially alined, and the terminal edges 54 and 56 on one roll half respectively abut the terminal edges 54 and 56 on the other roll half. The tabs 60 on each roll half also mesh, each recess 76 receiving a tab from the opposite roll half, and each outer tab 62 being radially adjacent to an inner tab 68 on the opposite roll half. The radial member 38 on each roll half is also axially adjacent to the radial member 40 on the opposite roll half. The meshing tabs and radial members prevent relative angular or axial movement between the roll halves.

An axial shaft 80 is then inserted through each pair of alined bores 42 and 44. The shaft is secured therein by a locking means 82, here shown as a set screw projecting radially inward through the radial members and engageable with the shaft. The shaft 80 can be either a single shaft extending the length of the roll or a pair of coaxial shaft stubs at opposite ends of the roll. The shaft extends beyond the opposite ends of the roll and is journaled at opposite ends on the frame sides 12 and 14.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A roll half for a roll of the class described comprising: a hollow, semi-cylindrical roll half having first and second opposite ends, a plurality of longitudinal ribs extending between said ends along its outer periphery, and first and second radial members having axial bores, the first and second radial members being spaced different distances from their respective ends, said roll half also having a plurality of diametrally opposed, longitudinally extending tabs projecting approximately tangentially from the longitudinal terminal edges of the roll half, said tabs being divided between outer and inner tabs arranged in an adjacent, alternating relationship between said first and second ends along each terminal edge, the outer face of each inner tab being substantially alined with the inner face of each outer tab on the same terminal edge.

2. A roll construction comprising: a pair of substantially identical, hollow, semi-cylindrical roll halves, each roll half having first and second opposite ends and first and second radial members proximate said first and second ends respectively, each radial member having an axial bore coaxial with the axis of the roll half, said roll halves coaxially cooperating to form a conditioning roll with the first end of each roll half being radially alined with the second end of the opposite roll half and with all of said axial bores in coaxial alinement.

3. The invention defined in claim 2 and including an axial shaft means mounted in said axial bores.

4. The invention defined in claim 3 wherein each roll half has a plurality of longitudinal ribs extending between said ends along its outer periphery, each rib being equally spaced angularly, the first rib from the longitudinal terminal edges on each roll half being spaced from said terminal edge so that the spacing between the ribs is equal around the entire circumference of the assembled conditioner roll.

5. The invention defined in claim 4 wherein each roll half has a plurality of longitudinally extending and alined, approximately tangential, alternating tabs and recesses along each longitudinal terminal edge, the recesses of each roll half receiving the tabs of the opposite roll half when the roll halves are assembled.

6. The invention defined in claim 5 wherein the alternating tabs and recesses extend in two adjacent rows along each terminal edge, with the tabs in one row being coextensive with and adjacent a recess in the adjacent row.

7. A roll construction comprising: a pair of identical, hollow, semi-cylindrical roll halves, each roll half having first and second opposite ends, a plurality of longitudinal ribs extending between said ends along its outer periphery, and first and second radial members having axial bores, the first radial member being proximate the first end and the second radial member being spaced from the second end substantially the same distance as the first radial member plus the axial dimension of the first radial end member, each roll half also having a plurality of diametrally opposed, longitudinally extending tabs projecting approximately tangentially from the longitudinal terminal edges of the roll halves, said tabs being divided between outer and inner tabs arranged in an alternating relationship between said first and second ends along each terminal edge, the outer face of each inner tab being substantially alined with the inner face of each outer tab on the same roll half edge, the roll halves cooperating to form a cylindrical fluted roll with the axial bores of each roll half being alined, the first radial end member of each roll half lying adjacent the second radial end member of the other roll half, and the outer face of each inner tab being adjacent the inner face of each outer tab on both roll halves; and an axial shaft extending through the bores in each roll end.

8. The invention defined in claim 7 wherein there is an even number of tabs along each terminal edge and each tab numbered from one end has substantially the same axial dimension as the tab of the same number numbered from the opposite end along the same edge.

9. The invention defined in claim 8 wherein each outer tab is diametrally opposed to the outer tab on the other terminal edge on the same roll half.

10. The invention defined in claim 9 wherein the outer surface of the outer tab lies on the outer periphery of the cylinder and the assembled roll has an even number of equally spaced longitudinal ribs around its periphery.

11. The method of producing a roll of the type described comprising: casting an iron, hollow, semi-cylindrical roll half having first and second ends, longitudinal ribs on its outer periphery between said ends, and radial end members proximate both ends, each radial end member having an axial bore, the radial member at one end being spaced a greater distance from the end than the other radial member, said roll half also having longitudinal terminal edges; positioning a pair of said roll halves with the first end of each roll half diametrally alined with the second end of the other roll half, with each terminal edge abutting a terminal edge of the opposite roll half, and with the bores on each roll half being coaxial; inserting an axial shaft through each pair of axial bores; and securing each shaft in said bores.

References Cited by the Examiner

UNITED STATES PATENTS

| | | | |
|---|---|---|---|
| 1,472,145 | 10/1923 | Villeneuve | 74—230.11 |
| 1,485,621 | 3/1924 | Loeffler | 74—230.13 X |
| 1,637,996 | 8/1927 | Guttridge | 74—230.11 X |
| 1,758,280 | 5/1930 | Evans. | |
| 1,763,124 | 6/1930 | Barber. | |

FOREIGN PATENTS 887,169  8/1953  Germany.

BILLY J. WILHITE, *Primary Examiner.*